United States Patent
Khusnatdinov et al.

(10) Patent No.: US 7,252,869 B2
(45) Date of Patent: Aug. 7, 2007

(54) MICROTEXTURED ANTIREFLECTIVE SURFACES WITH REDUCED DIFFRACTION INTENSITY

(76) Inventors: Niyaz Khusnatdinov, 3257 Ranch Park Trail, Round Rock, TX (US) 78681; Tanwin Chang, 300 Summer St. #72, Boston, MA (US) 02210

( * ) Notice: Subject to any disclaimer, the term of this patent is extended or adjusted under 35 U.S.C. 154(b) by 273 days.

(21) Appl. No.: 10/979,603

(22) Filed: Nov. 1, 2004

(65) Prior Publication Data

US 2005/0094277 A1    May 5, 2005

Related U.S. Application Data

(60) Provisional application No. 60/515,754, filed on Oct. 30, 2003.

(51) Int. Cl.
*B32B 3/30* (2006.01)
*G02B 5/18* (2006.01)
*G02B 1/11* (2006.01)

(52) U.S. Cl. .................... 428/141; 428/913; 428/220; 428/333; 359/601; 359/575

(58) Field of Classification Search ............... 428/141, 428/913, 220, 333; 359/601, 575
See application file for complete search history.

(56) References Cited

U.S. PATENT DOCUMENTS

| 4,013,465 A | 3/1977 | Clapham et al. |
|---|---|---|
| 4,114,983 A | 9/1978 | Maffitt et al. |
| 5,120,605 A | 6/1992 | Zuel et al. |
| 5,817,396 A | 10/1998 | Perlo et al. |
| 6,175,442 B1 | 1/2001 | Booth, Jr. et al. |
| 6,356,389 B1* | 3/2002 | Nilsen et al. ............... 359/625 |
| 6,359,735 B1 | 3/2002 | Gombert et al. |
| 6,388,372 B2* | 5/2002 | Raj et al. .................... 313/461 |
| 6,514,674 B1* | 2/2003 | Iwasaki ...................... 430/321 |
| 6,958,207 B1* | 10/2005 | Khusnatdinov et al. ..... 430/321 |
| 7,094,452 B2* | 8/2006 | Yamashita et al. ........... 428/1.3 |
| 7,108,819 B2* | 9/2006 | Harker et al. ............... 264/219 |
| 2002/0135869 A1 | 9/2002 | Banish et al. |

OTHER PUBLICATIONS

Wilson and Hutley, "The optical properties of 'moth eye' antireflection surfaces", Optica Acta, v29 No. 7, p. 993-1009 (1982).
Toyota et la., "Fabrication of Microcone Array for Antireflection Structured Surface Using Metal Dotted Pattern", Jpn. J. Applied Physics, 40, L747 (2001).
Raguin and Morris, "Antireflection Structured Surfaces for the Infrared Spectral Region", Applied Optics vol. 32 No. 7, (1993).

(Continued)

*Primary Examiner*—William P. Watkins, III

(57) ABSTRACT

A microstructured antireflective texture is disclosed comprised of an engineered array of protuberances arranged on a non-periodic lattice. The average distance between said protuberances is in the subwavelength regime of the waveband for which the antireflective effect is desired. The non-periodic arrangement of protuberances acts to suppress blue-green backscattered light that is commonly seen diffracting from antireflective textures that use strictly periodic lattice arrangements. Embodiments of the invention include the randomized square pattern, and the quasicrystal pattern.

3 Claims, 6 Drawing Sheets

OTHER PUBLICATIONS

Niggemann et al, "Periodic microstructures for large area applications generated by holography" pp. 108, Proceedings of the SPIE vol. 4438 (2001).

Lalanne and Hutley, "Artificial Media Optical Properties—Subwavelength Scale", published in the Encyclopedia of Optical Engineering, 2003.

Philippe Lalanne, "Design, fabrication, and characterization of subwavelength periodic structures for semiconductor antireflection coating in the visible domain" pp. 300-309, in SPIE Proceedings vol 2776, (1996).

Marjorie Senechal, "Tilings, Diffraction, and Quasicrystals", The Mathematica Journal, vol. 4, Issue 2 (1994).

* cited by examiner

MICROTEXTURED ANTIREFLECTIVE SURFACES WITH REDUCED DIFFRACTION INTENSITY

CROSS-REFERENCE TO RELATED APPLICATIONS

This application claims the benefit of PPA 60/515,754, filed 2003 Oct. 30 by the present inventors, with the same title as the present disclosure.

BACKGROUND OF THE INVENTION

1. Technical Field

This invention relates to antireflective microtextured surfaces. Further, the present invention relates to the optical properties of sub-wavelength gratings. The inventive articles described herein are microstructured antireflective textures designed to reduce diffraction intensity when compared to sub-wavelength gratings already known in the art.

2. Introduction to Prior Art

It is a well known technique to impart antireflective properties to an object, such as a sheet glass, by introducing microscopic corrugations to the surface of the object [see for instance: "Artificial Media Optical Properties-Subwavelength Scale", Lalanne and Hutley, published in the Encyclopedia of Optical Engineering, 2003]. We refer to such low reflectance surfaces as microstructured antireflective textures (MARTs). The microcorrugations of a MART typically are on a length scale sufficiently small—usually in the sub-wavelength regime—to prevent diffusive scattering of light commonly exhibited by a "matte" or "non-glare" finish. That is, a MART truly reduces the hemispherical reflectance from a surface rather than merely scattering or diffusing the reflected wavefront. In this regime, the interaction of light with a microstructured surface is usually described using an "effective medium theory", under which the optical properties of the microtextured surface are taken to be a spatial average of the material properties in the region [Raguin and Morris, "Antireflection Structured Surfaces for the Infrared Spectral Region", Applied Optics Vol. 32 No. 7, 1993). The hemispherical reflectance of light from glass back into air can be less than 0.5% for a properly designed MART. Such a small hemispherical reflectance is impossible if the surface corrugations are much larger than the wavelength of incident light. For visible light, the length scale of MART corrugations is typically around one-half micron.

Perhaps the best known MART is the so-called "moth-eye" surface which possesses optical properties that may be more effective than commercially available thin-film coatings. Thin-film antireflective coatings usually consist of one or more layers of materials optically dissimilar from the substrate, and are sputtered or evaporated onto the substrate in precisely controlled thicknesses. Moth-eye surfaces are comprised of a regular array of microscopic protuberances, and are presently available from a small number of manufacturers worldwide (for example Autotype International Limited, in Oxon, England). Other examples of MARTs are the "SWS surface" [Philippe Lalanne, "Design, fabrication, and characterization of subwavelength periodic structures for semiconductor antireflection coating in the visible domain" pp. 300-309, in SPIE Proceedings Vol. 2776, (1996)], and the "MARAG" surface [Niggemann et al, "Periodic microstructures for large area applications generated by holography" pp 108, Proceedings of the SPIE vol. 4438 (2001)].

Despite moth-eye's excellent antireflective performance, a problem with this particular MART is related to unwanted diffraction. A moth-eye surface designed for the visible waveband exhibits diffraction at oblique angles typically from deep blue to green. When a moth-eye surface is used as an antireflective treatment for a transparent window, this diffraction adulterates the colors of the transmitted image. Therefore, reduction of this diffraction would enhance the value of MARTs as an antireflective treatment for glazing materials for picture frames, TV screens, personal handheld devices, cellular phones, shop windows, and any other application where an image is protected by a window.

Fabrication of the Moth-Eye Microstructure Using Interference Lithography

Clapham and Hutley (U.S. Pat. No. 4,013,465) describe a method to produce a microstructured antireflective texture that is broadband with large angular acceptance of incident light. This MART is characterized by a surface covered with a regular array of conical protuberances, where the feature sizes of the tapered protuberances are in general sub-wavelength. This surface profile was dubbed the "moth-eye" antireflective surface, since Bernhard (Endeavor 16, p. 76-84, 1967) first noticed that the eyes of night flying moths were covered with an array of sub-wavelength protuberances, and hypothesized that the function of this profile was precisely to reduce the reflectivity of the eyes of these moths making them less detectable to predators.

The Clapham and Hutley patent suggests a photo-exposure method to produce the moth-eye microtexture. The patent further discloses the specific technique of "interference lithography" that involves exposing photoresist to an interference pattern from multiple beams of coherent light. A limitation of interference lithography is the strict periodicity of the pattern generated by this technique. If two beams of coherent light are used to expose a sample, a periodic square array of protuberances can be achieved with multiple exposures. If three beams are used, a pattern with hexagonal symmetry is achieved in a single exposure. In general, the details of the exposure can be varied to obtain a pattern with varying degrees of symmetry. Nevertheless the resulting patterns of protuberances will still be periodic with long-range order.

The blue-green diffraction effects observed in typical moth-eye surfaces fabricated by interference lithography is due to the periodicity of the sub-wavelength grating that comprises this MART. To understand this, first consider the diffraction of light from a one-dimensional periodic grating. The typical period or pitch size of a motheye structure designed to work in the visible waveband from 400 nm to 700 nm is d=250 nm. The 1D grating equation is:

$$m\frac{\lambda}{d} = (\sin\gamma - \sin\varphi) \le 2, \quad m = 0, \pm 1, \pm 2 \ldots \quad \text{(EQ. 1)}$$

In this equation m is the diffraction order and $\varphi$ is the angle of incident light, while $\gamma$ is the diffracted angle, and the grating has spatial period d. (EQ. 1) is one of the main requirements for constructive interference from a grating with a periodic structure.

Since moth-eye is a sub-wavelength grating, we wish to focus on the case where $\lambda > d$ for all wavelengths in the band of interest. Since the absolute value of the expression in parentheses of (EQ 1) is no greater than 2, we find that m can only take on the values m={−1, 0, 1}, implying that second or higher order diffraction does not exist for a sub-wavelength grating. Let us consider two important cases, (a) illumination at normal incidence, and (b) illumination at oblique incidence.

Case (a). Incident light is perpendicular to the grating surface, i.e. $\phi=0$. For $\lambda>d$ the only solution to (EQ. 1) when $\phi=0$ is the zeroth m=0 order. If d=250 nm (smaller than any wavelength in the visible band), we conclude that any visible light normally incident on a sub-wavelength grating does not undergo diffraction into non-zero orders.

Case (b). Light propagates towards the sub-wavelength grating at a grazing angle of incidence. Let's consider specifically $\phi=-90°$ (the case for $\phi=+90°$ is essentially identical). No solution for $\gamma$ exists for the case of m=−1. If m=0 then $\gamma=-90°$ corresponding to a diffracted beam with a k-vector in the same direction as the incident beam. In the case of m=1, there is a solution for $\gamma$ provided that $\lambda \leq 2d$. For the typical moth-eye grating period of 250 nm, 2d=500 nm, and visible light with wavelengths smaller than this may be diffracted by the grating. That is why moth-eye surfaces have a characteristic blue-green tint when illuminated and viewed from oblique angles. Interestingly, none of the diffracted beams have a vector component in the same direction as the k-vector of the incident beam. That is, the m=−1 order tends to be diffracted back towards the source, with the color of the diffracted beam going from greenish to more blue as the viewing angle decreases towards the normal.

Two Dimensional Gratings

A real moth-eye surface fabricated by interference lithography is a two-dimensional grating, rather than a one-dimensional grating used in the example above. However, the arguments for the appearance of diffracted orders at high angles of incidence are still valid keeping in mind that diffraction into non-zero orders will occur in preferred azimuthal directions that are consistent with the symmetry of the pattern.

In the 2D case, we can estimate diffraction intensity by numerically summing the phases due to diffraction off of all the individual vertices of the lattice, instead of using (EQ. 1). Strong diffraction intensities will occur in directions for which the phases combine constructively. For instance, consider the diffraction from a square-lattice (as illustrated schematically in FIG. 1), which is usually the pattern used for moth-eye surfaces. If light impinges on this structure at normal incidence, no light will be diffracted into first-order or higher peaks, just as in the 1D case. In order to see non-zeroth order diffraction, light at oblique incidence must be used. FIG. 2 shows the polar distribution ($\theta$, $\gamma$) of intensity of diffracted light from a square lattice grating at the oblique angle of illumination $\sigma=0°$ and $\phi=60°$. Here $\sigma$ and $\phi$ are the polar and azimuthal angles, respectively, in spherical polar coordinates for the incident light, while $\theta$ and $\gamma$ are the corresponding angles for diffracted light. For this calculation, the square lattice grating is oriented so that one of its high symmetry axes is lined up along the $\sigma=0°$ direction, and its lattice constant has been set to 250 nm. The zeroth order diffraction beam 12 in FIG. 2 has its peak at $\theta_0=180°$ and $\gamma_0=60°$. The backscattered m=−1 diffraction beam 14 peaks at $\theta_{-1}=0°$ and $\gamma_{-1}\approx 48°$.

The zeroth-order peak makes an angle relative to the normal that is equal to the angle (relative to normal) of the incident beam. Zeroth-order diffraction is what we usually think of as the simple reflection of incident light. For this reason, if we refer to "diffraction" we usually do not mean to include the zeroth-order beam (which from now on will be called the "reflected beam", and if we wish to "reduce diffraction" what we mean is to reduce first-order or higher diffraction. In this example of the square lattice, the peak intensity of the backscattered diffraction beam 14 is comparable in magnitude to the intensity of the reflected beam 12. The calculation was performed for a finite array of 8×8 lattice sites, and therefore is only an approximation of a truly infinite periodic array, but it does capture fairly quantitatively the optical behavior of the system. We have performed the same calculation for a regular hexagonal lattice (not shown) and found that in this case also, the reflected and backscattered beams are comparable in magnitude.

Also note that these plots use arbitrary units, and although the reflected beam appears prominently, it is actually much smaller compared to the reflected beam in the absence of a textured surface.

A Theoretically Obvious Solution

How can we reduce the intensity of the backscattered diffraction peak? We turn again to (EQ. 1). Recall that the diffraction is possible (for oblique angles of incidence) only if $\lambda \leq 2d$. Therefore if we are able to make $d<\lambda/2$, it should be possible to suppress all diffraction (we're not counting the reflected beam as a "diffracted beam"). Thus for the visible waveband, the theoretically obvious solution is simply to fabricate moth-eye on a square lattice where the pitch or lattice constant d (the 2D equivalent of the 1D period d) is smaller than 200 nm. This solution has a tradeoff. The moth-eye protuberances must be relatively tall in order for them to be effective for the long wavelength end of the spectrum. That is, the shorter the protuberances, the less effective the texture is at reducing reflectance, especially for redder light. But if the pitch is decreased, then the aspect ratio between height and pitch must be increased in order to hold the height constant. In terms of microstructure fabrication, it is true that smaller aspect ratios are preferred for reproducibility, ease of replication, and mechanical strength. Therefore, we seek another (not obvious) solution to reduce diffraction without decreasing the overall pitch size or increasing the aspect ratio.

Recap of the Problem

The motheye patterns having nice antireflective properties still demonstrate significant diffraction of light in lower wavelength range for which they were designed. Square and hexagonal lattices produce diffraction patterns that can be visible to the human eye. That makes periodic motheye patterns less effective at high angles of incident and reflected lights. In other words motheye ability to not reflect the light interferes with diffraction effects from incident light leading to backscattering and reflection.

BRIEF SUMMARY OF THE INVENTION

The inventive article of this patent is a microstructured antireflective texture (MART) comprised of an engineered array of protuberances (EAP), where the average distance between the peaks of the protuberances is in the sub-wavelength regime, and the protuberances are arranged on a non-periodic lattice. The key inventive concept over the prior art is the non-periodic arrangement. The non-periodic arrangement suppresses the unwanted blue-green diffraction commonly associated with moth-eye and other periodic MARTs.

DETAILED DESCRIPTION OF THE INVENTION

The diffraction of obliquely incident light from the surface of a periodic MART (microstructured antireflective texture) is undesirable since it may adulterate the color of images transmitted through the antireflective surface. One type of MART, known as moth-eye, is comprised of a regular array of microscopic protuberances. Traditionally, the method to fabricate moth-eye arrays involved a technique called interference lithography, which resulted in strictly periodic arrays of protuberances. With recent advances in photolithography techniques one can generate an engineered array of protuberances (EAP), where the protuberances may be positioned in arbitrary patterns. Khusnatdinov and Chang's U.S. Pat. No. 6,958,207 describes a method for producing MARTs with arbitrary geometry using standard photolithography masks.

Several embodiments of non-periodic EAP structures that also qualify as MARTs (preserving the antireflective property of the texture) are described below.

1) randomized array.
2) quasiperiodic array.
3) randomized quasiperiodic array.

Randomized Lattices

We propose that a two-dimensional "randomized" lattice is effective for suppressing unwanted diffraction in MARTs comprised of an engineered array of protuberances (EAP). In a randomized lattice, the positions of the protuberances are displaced by some relatively small amount from the positions of a regular periodic array in a random fashion. Not every non-periodic array of protuberances can be an effective MART due to other restricting requirements for the surface texture to be effective as antireflective coating.

In this document, the words "lattice" and "array" are used interchangeably.

In order for an EAP texture to be an effective antireflective treatment (MART), the average distance between protuberances should not exceed some critical distance. Otherwise bare regions that are free of protuberances will become areas of high reflectivity. For visible waveband, the average distance between the protuberances should not be much larger than 250 nm. Further, there should be no significant overlapping of protuberances. When protuberances overlap, the variation in height from apex to valley between protuberances will be smaller than usual, leading to loss of antireflective effectiveness at long wavelengths. If too many protuberances overlap significantly it will lead to overall reduction of the antireflective effect.

Figure 3:
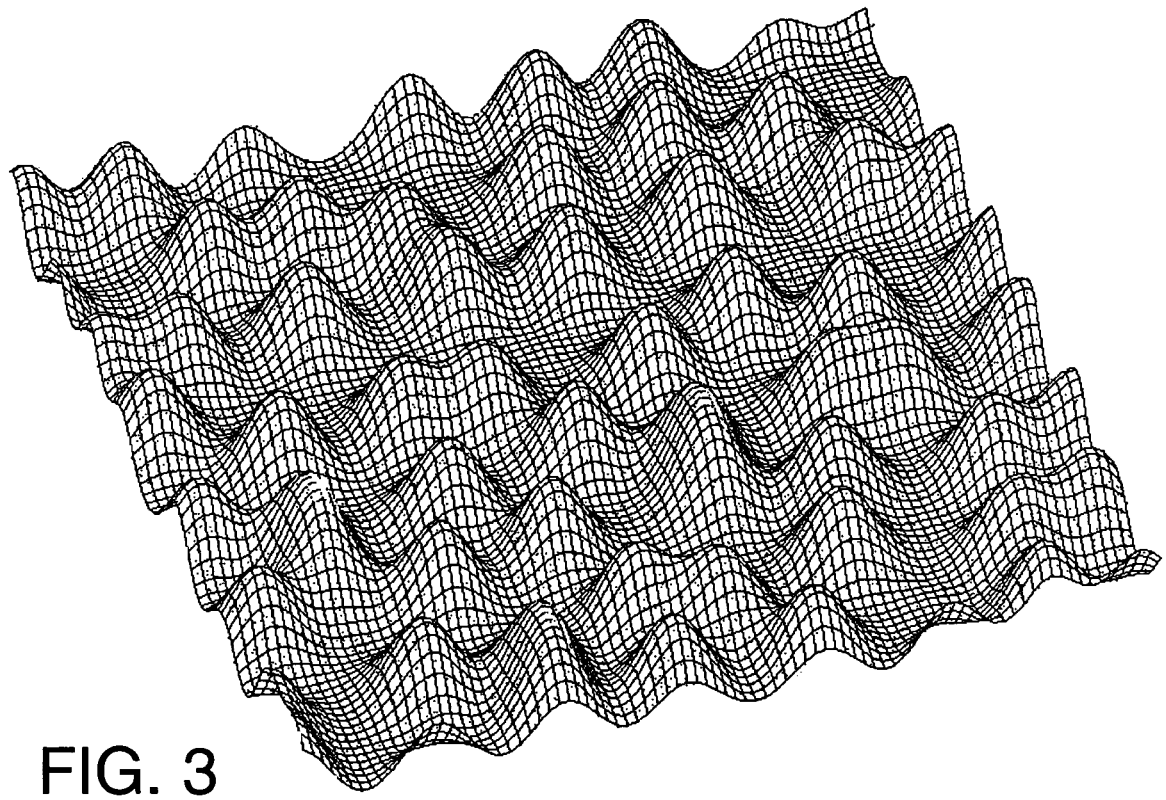
FIG. 3 shows the isometric view of a dithered array of protuberances.
Figure 4:
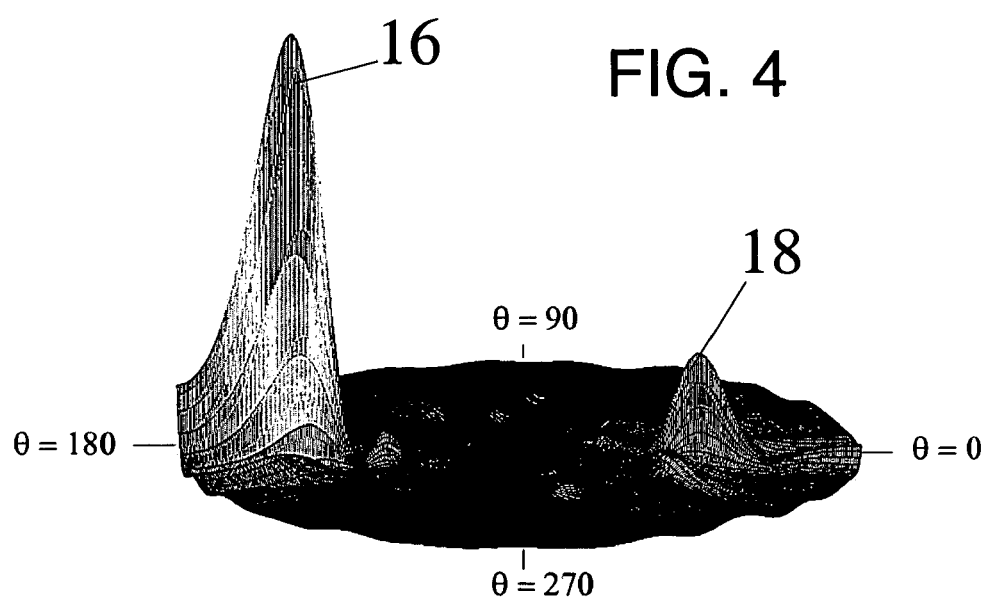
FIG. 4 shows a numerically calculated estimate of the intensity pattern due to the interaction of incident light with randomized square lattice structure shown in FIG. 3.

Randomized Square Lattice. In order to satisfy the antireflective requirements, we construct our randomized lattice using a random but limited displacement of each of the protuberances from the positions of a regular square lattice. In this example the "prototype" square lattice consisted of 8×8 units, with a period of 250 nm. Each of the protuberance coordinates $(X_{i0}, Y_{i0})$, measured at the peaks of the protuberances, have been altered in the following way $$X_i = X_{i0} + \text{Random}(1) * \Delta X$$

$$Y_i = Y_{i0} + \text{Random}(1) * \Delta Y$$

Where displacements $\Delta X$ and $\Delta Y$ are fixed for the entire lattice. The function Random(1) generates uniformly distributed random numbers between −1 and 1. We call this a "randomized square lattice", as shown in FIG. 3.

Figure 1:
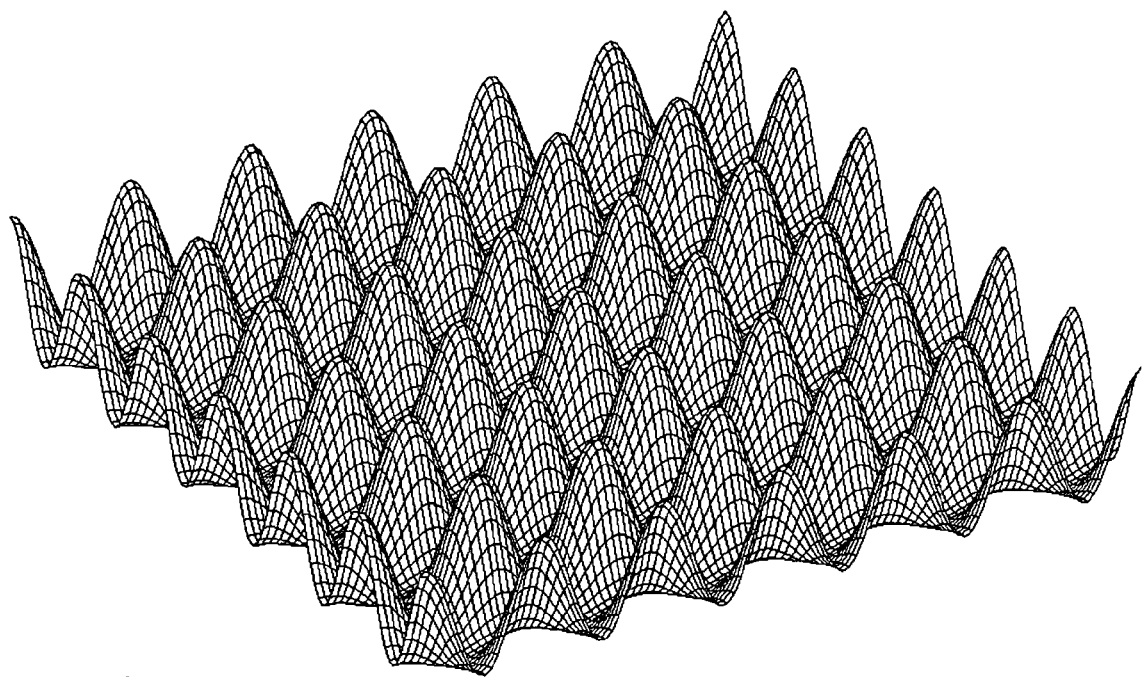
FIG. 1 shows the isometric view of an engineered array of protuberances arranged on a square lattice. This surface relief profile, a regular ordered array, is typical of the moth-eye microtexture that is well known in the art.
Figure 2:
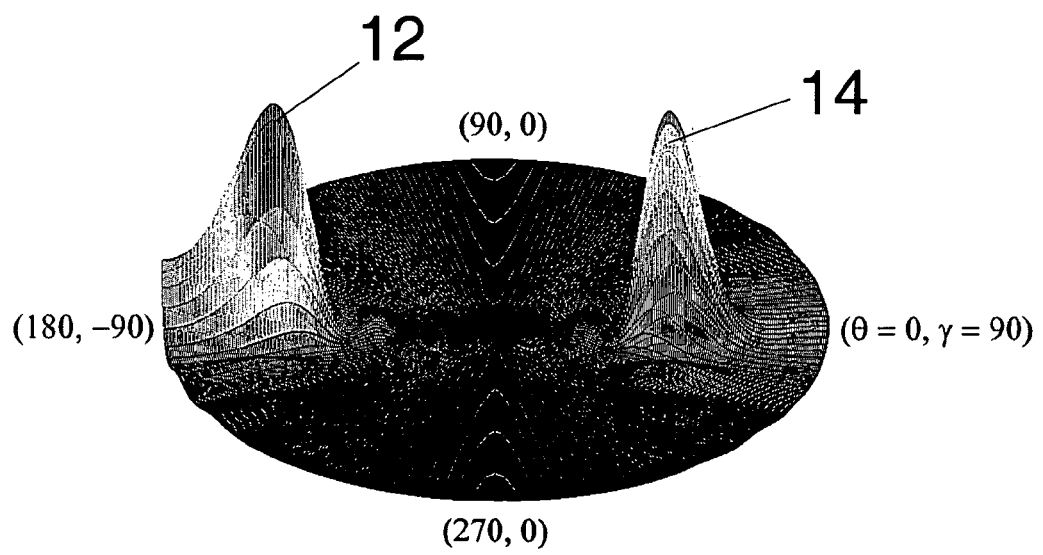
FIG. 2 shows a numerically calculated estimate of the diffraction pattern due to the square lattice structure shown in FIG. 1.

The diffraction pattern from such a randomized surface is shown on FIG. 2. The incident light comes from the oblique polar angle $\phi=60°$, and the incident light plane is at $\sigma=0°$. In the figure one can see a remnant of the prototype square lattice's first-order diffraction peak. That is because $\Delta X$ and $\Delta Y$ were small compared to the period of the lattice for this calculation. The first non-zero-order (NZO) intensity peak 18 is significantly smaller (measured against the reflected intensity 16) compared to the case of the square lattice in FIG. 1 where the first-order diffraction peak 14 is the same height as the reflected peak 12. (Note that for non-periodic structures, it may not be strictly correct to use the terms "diffraction" and "first-order" when discussing the intensity peaks.)

In comparing the reflected peak 12 of the square lattice with the reflected peak 16 of the randomized square lattice, we expect both these peaks to be about the same magnitude. That is because the antireflective property of the texture does not depend much on the arrangement of the array or protuberances (as long as the average spacing and height requirements of the protuberances are met). It's only the diffractive properties that are strongly affected by the lattice geometry. Therefore, we conclude that the NZO intensity in the randomized square lattice is much smaller than the first-order diffraction peak in the square lattice, and that the randomized square lattice will suffer much less from the annoying blue-green diffraction that is a property of periodic MARTs like moth-eye.

Besides the randomized square lattice, other regular lattices can be randomized also in a process analogous to that explained above. For instance, the randomized hexagonal lattice will exhibit less blue-green backscattering than the strictly periodic hexagonal lattice.

Quasiperiodic Lattices

A more elegant solution for a non-periodic EAP structure that satisfies the antireflective requirements of a MART is the quasiperiodic lattice. A quasiperiodic tiling fills space in an orderly and systematic manner without being periodic, and is generally understood to require more than one tile shape. In a periodic tiling, a copy of the (infinitely large in area) tiling may be shifted so that it exactly matches up with the original again using a linear combination of a finite set of basic translations. With a quasiperiodic tiling, a copy may be translated so that small areas matches up with other areas, but when considering the entire plane, the tilings will inevitably fail to match.

Figure 5:
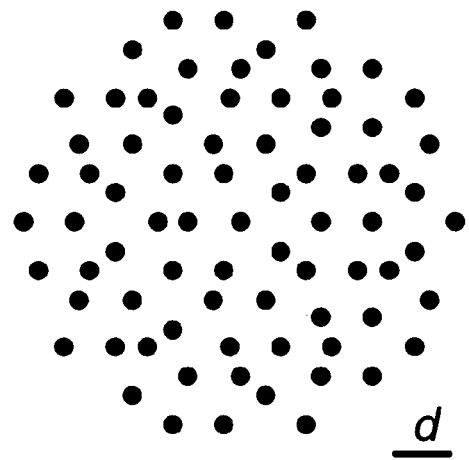
FIG. 5 shows a schematic view of the positions of the vertices of an array of protuberances arranged on a quasi-periodic pattern.
Figure 6:
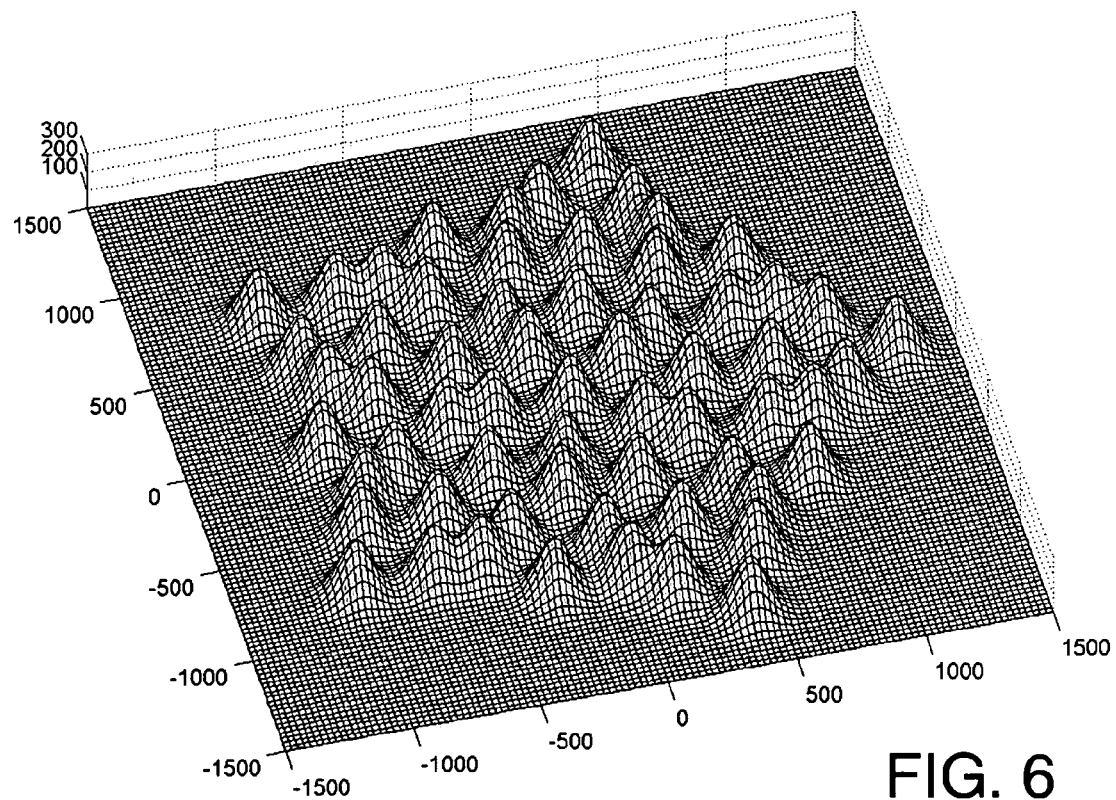
FIG. 6 shows the isometric view of an engineered array of protuberances arranged on a quasiperiodic array.

We propose that the protuberances of the EAP MART be positioned at the vertices of a quasiperiodic tiling, thus forming a quasiperiodic lattice. A very famous example of a quasiperiodic pattern is the Penrose tiling pattern, with 5-fold symmetry. For the remaining discussion of quasiperiodic patterns we will use as an example the Penrose tiling, however, our invention extends to all versions of quasiperiodic patterns. (When discussing quasiperiodic patterns, we include finite sized patterns that are constructed using the same rules for constructing infinitely large quasiperiodic patterns.) FIG. 5 shows the lattice positions of a finite area of a Penrose tiling with the lattice constant d as a characteristic length scale of the tiling. FIG. 6 depicts an EAP MART structure built on the quasiperiodic lattice shown in FIG. 5.

Figure 7:
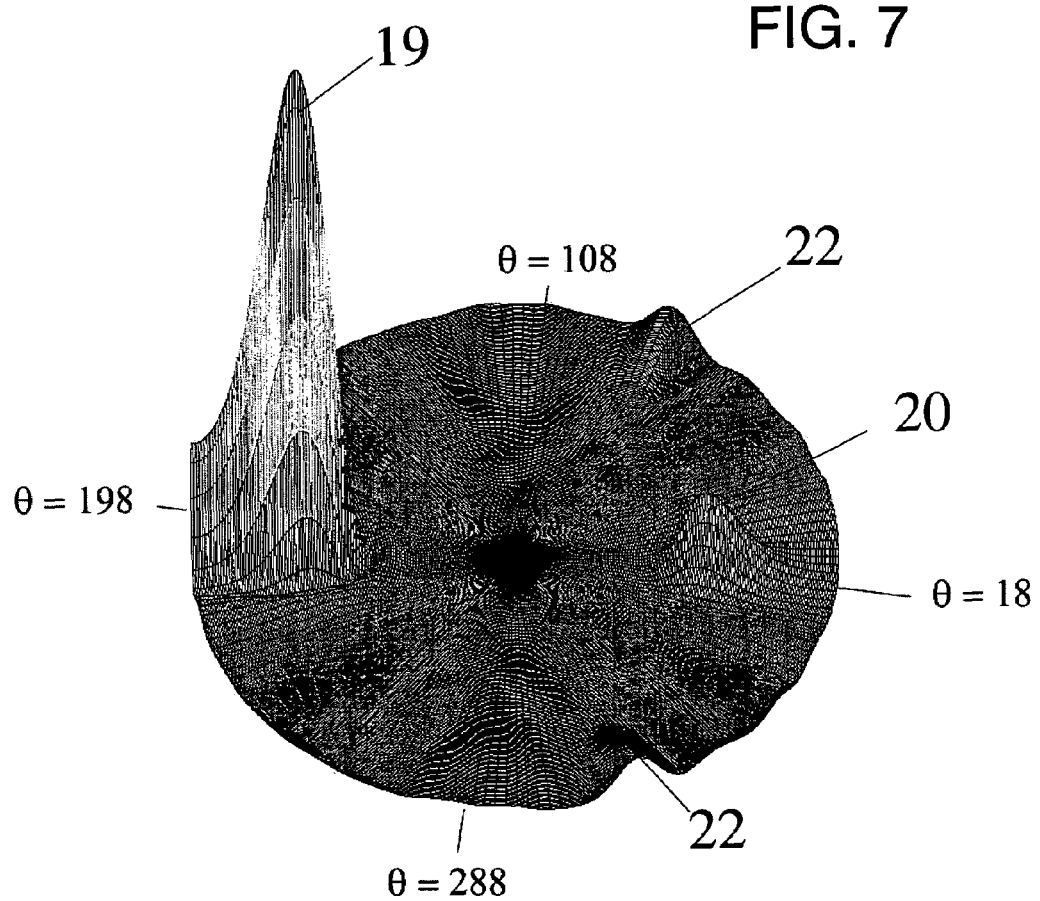
FIG. 7 shows a numerically calculated estimate of the intensity pattern due to the interaction of incident light with the quasiperiodic lattice structure shown in FIG. 6.

FIG. 7 shows the estimated interaction of 400 nm light with the quasiperiodic pattern shown in FIG. 6, incident at an oblique polar angle of illumination $\phi=60°$. The incident light plane is positioned at $\sigma=18°$ to maximize the diffraction. In this calculation, one of the "petals" of the 5-fold symmetric Penrose tiling is oriented along the $\sigma=0°$ direction. The main non-zero order (NZO) intensity peak 20 is much lower than the reflected intensity peak 19. For the parameters used, the main NZO peak 20 is around 15% of the intensity of the reflected peak 19. Note also the presence of "side" NZO peaks 22, which are even smaller in intensity.

Randomized Quasiperiodic Lattices

In direct analogy to the randomized square lattice, we can generate a randomized quasiperiodic lattice by randomly displacing the protuberance positions from the original positions of a prototype quasiperiodic lattice. Again, the magnitude of the random displacements must be limited to prevent significant overlapping or the appearance of large areas of protuberance-free voids.

Figure 8:
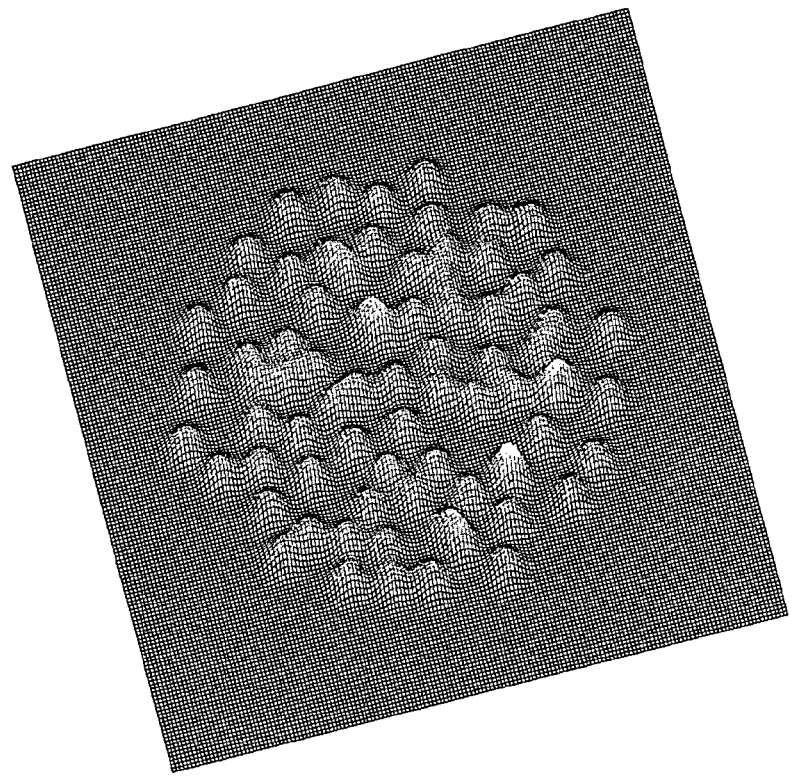
FIG. 8 shows the isometric view of an engineered array of protuberances arranged on a randomized quasiperiodic array.
Figure 9:
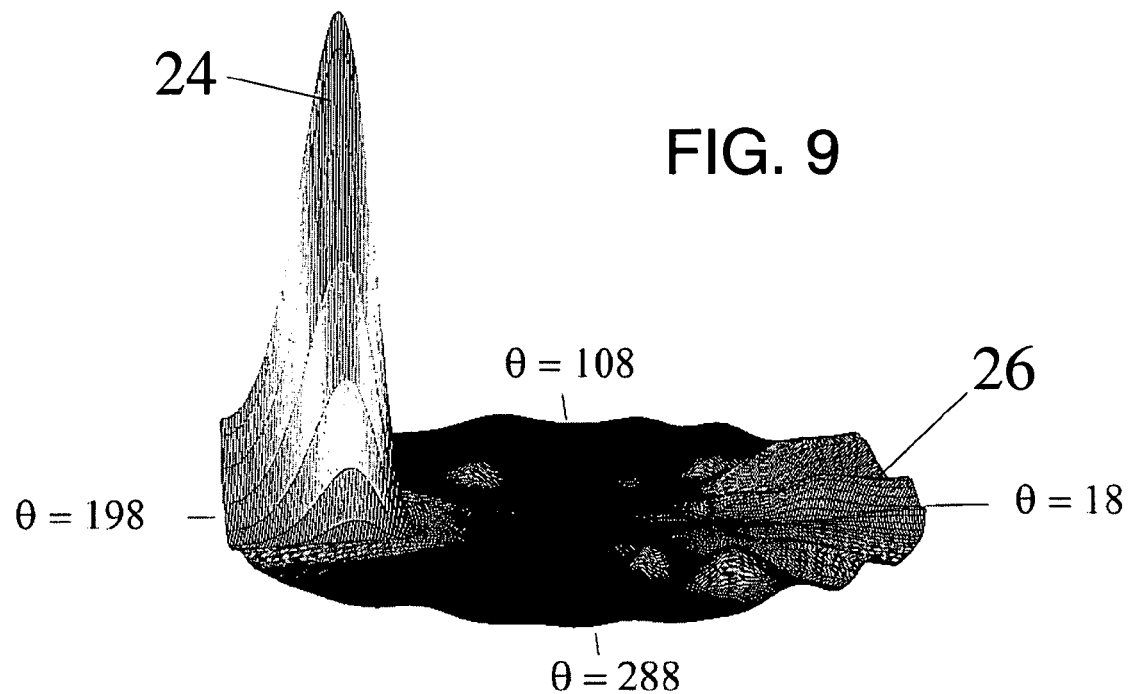
FIG. 9 shows a numerically calculated estimate of the intensity pattern due to the interaction of incident light with the randomized quasiperiodic lattice structure shown in FIG. 8.

FIG. 8 depicts an EAP MART structure built on a randomized quasiperiodic lattice. FIG. 9 shows the intensity of light (in arbitrary units) coming from the randomized quasiperiodic lattice when illuminated at an oblique angle ($p=60°$ and wavelength $\lambda=400$ nm. The incident light plane is $\sigma=18°$, and the central protuberances (where central protuberances includes the protuberance in the center of the pattern and its closests neighbors) of the prototype quasiperiodic lattice sit 250 nm apart from each other. Note that the non-zero-order (NZO) intensity peak 26 are virtually absent in comparison to the reflected peak 24. Therefore, the blue-green backscattered light from this structure should be virtually invisible compared to the backscattered light from a moth-eye texture (with a periodic square array) when both are illuminated under similar conditions.

Comparison of Backscattered Intensity

Figure 10:
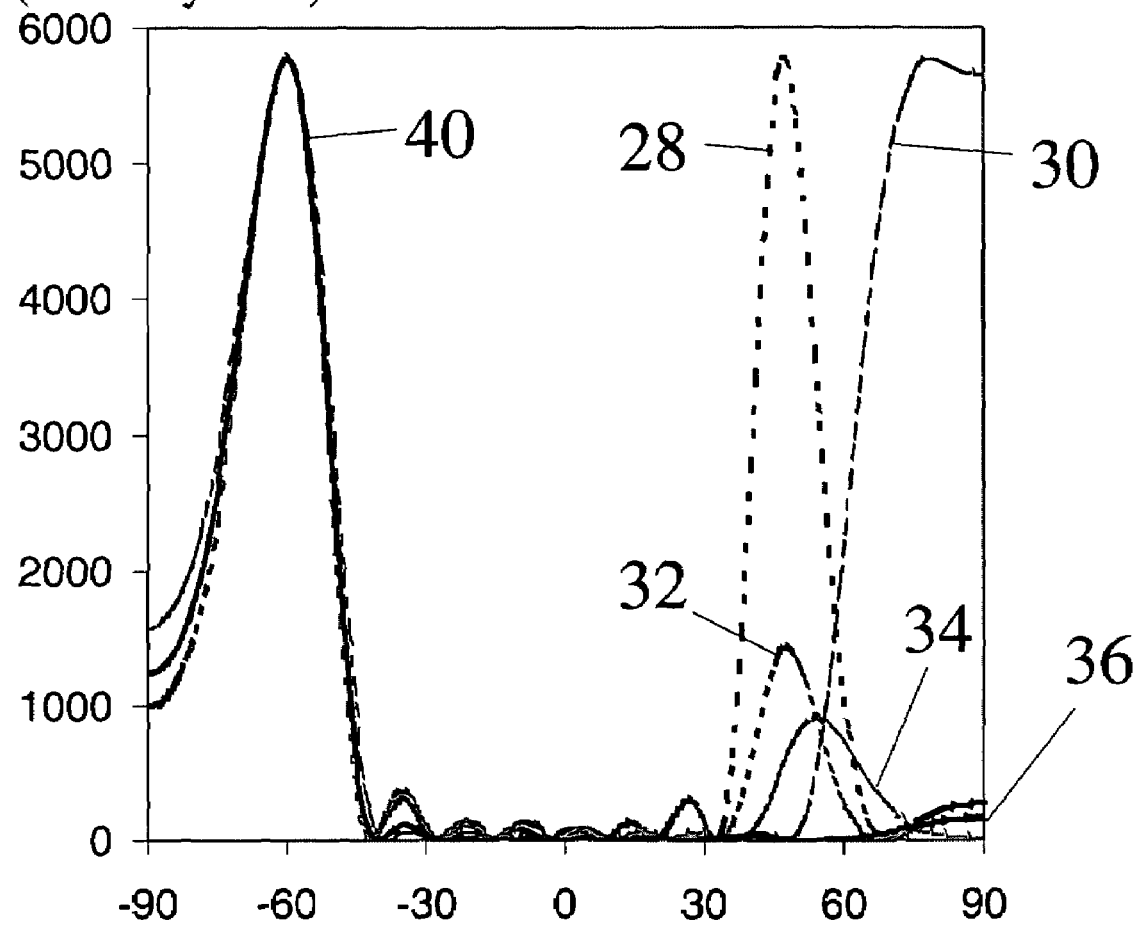
FIG. 10 shows a numerically calculated estimate of the diffraction pattern due to the quasiperiodic lattice structure shown in FIG. 6.

FIG. 10 shows a comparison of the backscattering intensities from EAP structures of different lattices, relative to the reflected intensity. Plotted on this graph are the curves for a regular (periodic) square lattice 28, a regular (periodic) hexagonal lattice 30, a randomized square lattice 32, a quasiperiodic lattice 34, and a randomized quasiperiodic lattice 36. For all types of lattices, the reflected intensity has a peak at polar angle $\gamma=-60°$. The incident light for these calculations impinged from the polar angle $\phi=60°$ with wavelength of 400 nm, and the orientation of the azimuthal angle for the backscattered light a was chosen to maximize the intensity. Among these lattice arrangements, the randomized quasiperiodic lattice exhibits the smallest non-zero-order (NZO) backscattering, while the quasiperiodic lattice is the next smallest.

When designing MARTs based on engineered array of protuberances (EAP): if the goal is to reduce any non-zero backscattering intensity that may occur at oblique angles of incidence, we conclude that:

1) A quasiperiodic lattice has significantly reduced NZO backscattering compared to a periodic lattice.
2) A randomized lattice has reduced NZO backscattering intensity compared to a non-randomized prototype lattice.

The inventive articles listed in the above examples are not exhaustive; the specifications may include inventions not cited in the specific embodiments.

The invention claimed is:

1. An article that is a surface with antireflective properties wherein said
   antireflective properties are achieved by alteration of surface topology, and
   a) said surface topology is comprised of an engineered array of protuberances wherein the average distance between neighboring protuberances is smaller then the optical wavelength of incident light, and
   b) the protuberances are arranged on a non-periodic lattice, and
   c) the positions of the protuberances are displaced by some relatively small amount from the positions of a regular periodic array in a random fashion.

2. An article that is a surface with antireflective properties wherein said
   antireflective properties are achieved by alteration of surface topology, and
   a) said surface topology is comprised of an engineered array of protuberances wherein the average distance between neighboring protuberances is smaller then the optical wavelength of incident light, and
   b) the protuberances are arranged on a non-periodic lattice, and
   c) the protuberances are positioned at the vertices of a quasiperiodic tiling.

3. An article that is a surface with antireflective properties wherein said
   antireflective properties are achieved by alteration of surface topology, and
   a) said surface topology is comprised of an engineered array of protuberances wherein the average distance between neighboring protuberances is smaller then the optical wavelength of incident light, and
   b) the protuberances are arranged on a non-periodic lattice, and
   c) the positions of the protuberances are arranged as a randomized quasiperiodic lattice that is generated by randomly displacing the protuberance positions from the original positions of a prototype quasiperiodic lattice.

* * * * *